United States Patent Office 3,209,592
Patented Oct. 5, 1965

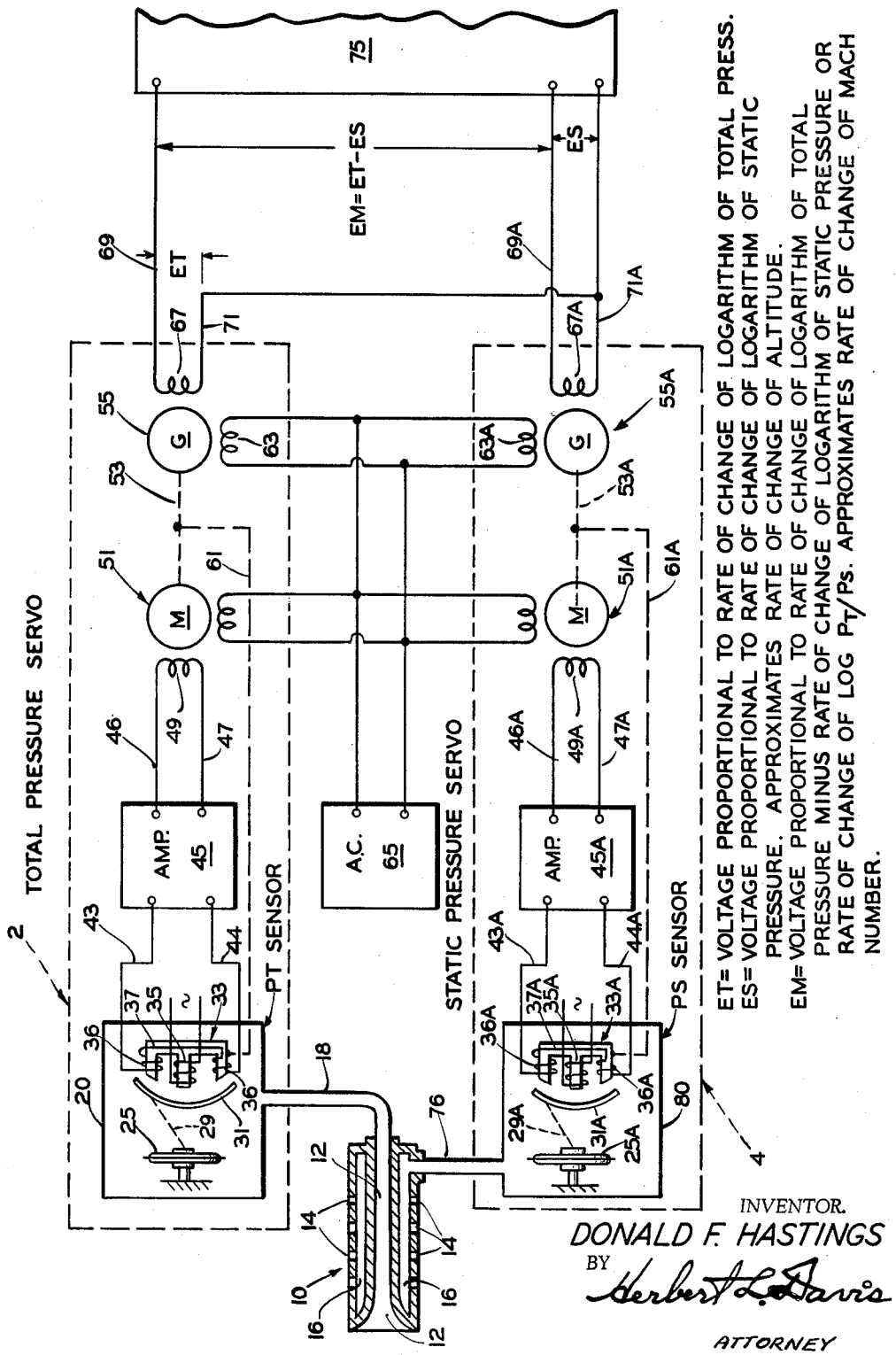

3,209,592
MACH RATE SIGNAL GENERATING DEVICE
Donald F. Hastings, Suffern, N.Y., assignor to The Bendix Corporation, Teterboro, N.J., a corporation of Delaware
Filed Oct. 15, 1962, Ser. No. 230,593
2 Claims. (Cl. 73—182)

This invention relates to a Mach rate signal generating device and more particularly to a novel means for effecting a Mach rate signal for use as a stabilizing signal to be applied to an automatic pilot or to other suitable mechanism, as may be desired.

Heretofore, in many air data computers, the Mach rate function has been produced by suitable mechanism having a servoed shaft position available which is proportional to the logarithm of total impact air pressure and another shaft position proportional to the logarithm of static air pressure, and in which mechanism the latter shaft position is mechanically subtracted from the former shaft position in a differential mechanism. The output of this differential mechanism is a shaft position proportional to log $P_T/Ps$. This function is fairly close to Mach number, but is normally converted to a shaft position proportional to true Mach number by a cam and differential. However, due to the fact that it is undesirable to run such a differential mechanism at high speeds or to design practical computing cams for more than about 340° rotation, the Mach output is usually a low speed shaft rotating less than one turn. If only a few Mach outputs in the form of synchros or potentiometers are required, they may be driven directly from this shaft.

If many outputs are required, it may be necessary to reservo the shaft in order to obtain sufficient torque. In some cases, reservoing is used only to permit a more flexible modular construction for the computer.

If reservoing is used, the servomotor may be coupled directly or with a low gear ratio to a tachometer generator which develops a voltage output proportional to Mach rate.

In cases where reservoing is not necessary or desirable, either because of high output loads or for modular design, it would still be necessary to reservo to obtain a high speed Mach shaft if a Mach rate signal is required.

An object of the invention is to provide a novel electrical means for obtaining a Mach rate signal or a satisfactory equivalent without the use of a Mach servo mechanism.

Another object of the invention is to provide a novel electrical signal generating mechanism including a computational chain having a log $P_T$ controlled servomotor and a log $Ps$ controlled servomotor and in which, by coupling a tachometer generator to each of these respective servomotors, there would be effected a log $P_T$ rate signal and a log $Ps$ rate signal, and in which arrangement, the output of the respective tachometer generators may be applied to an electrical network so as to subtract the log $Ps$ tachometer generator voltage from the log $P_T$ tachometer voltage to effect a resultant voltage which is proportional to log $P_T/Ps$ which may be applied directly as a Mach rate signal to an automatic pilot as a stabilizing signal, since the function log $P_T/Ps$ is sufficiently close to the Mach function that it may be substituted for a Mach rate as an autopilot stabilizing signal.

These and other objects and features of the invention are pointed out in the following description in terms of the embodiment thereof which is shown in the accompanying drawings. It is to be understood, however, that the drawing is for the purpose of illustration only, and is not a definition of the limits of the invention, reference being had to the appended claims for this purpose.

In the drawing:

The drawing is a schematic showing of a Mach rate signal generating device embodying the invention.

Referring to the drawing, there is indicated by the numeral 2 a total pressure servo, and by the numeral 4 a static pressure servo, and by the numeral 10 an air pressure probe of conventional type such as a pitot tube which may be positioned in the free air stream and mounted on the airfoil of an aircraft so as to sense through the passage 12 total impact air pressure and through passage 14, the static atmospheric pressure during flight of the aircraft at Mach numbers above and below that of the speed of sound. The impact or total impact air pressure, as sensed through the passage 12, increases with the speed of the aircraft, and this total pressure is indicated by the symbol PT.

The static atmospheric pressure is further sensed through passage 14 in the side of the pitot tube 10 and leading to a passage 16. The sensed static atmosphere pressure or indicated static pressure is designated hereinafter as PSI.

As shown in the drawing, the pressure $P_T$ is applied through a conduit 18 to a pressure sensing mechanism 20 in the total pressure servo 2. The pressure sensing mechanism 20 may be of a suitable type such as shown, for example, in U.S. Patent No. 2,945,995, granted July 19, 1960, to Norman Wail and assigned to The Bendix Corporation.

In the mechanism 20, there is indicated by a numeral 25 a diaphragm or bellows responsive to the sensed pressure $P_T$ and operatively connected through a suitable linkage indicated by the numeral 29 to an armature or magnetic control vane 31 of an E-pickup device indicated generally by the numeral 33 and including an energizing winding 35 connected to a suitable source of alternating current and inductively coupled to the control winding 36 through the E-shaped core 37 and armature 31.

The E-pickup device 33 is of a conventional type and is so arranged that the vane or armature 31 may be adjusted by the bellows 25 relative to the core 37 so as to control the phase and magnitude of the alternating current induced in the windings 36 and applied across output lines 43 and 44 leading from the E-pickup 33.

Thus a change in the sensed total pressure applied to the diaphragm 25 would cause a change in the displacement of the E-pickup vane 31 and result in an output error voltage from the E-pickup. This error voltage is in turn applied across the output lines 43 and 44 leading to an electronic amplifier 45 of conventional type having output lines 46 and 47 leading to a control winding 49 of a suitable variable speed two phase servomotor 51 of conventional type driving through a shaft 53 a tachometer generator 55.

The arrangement is such that the error voltage applied through the amplifier 45 to the motor 51 causes the motor 51 to turn the shaft 53 and the generator 55 at a speed varying with the rate of change in the logarithm of the sensed pressure $P_T$. The E-core 37 is repositioned by a follow-up shaft 61 driven from shaft 53 in a sense to reduce the error voltage to zero.

For a constant rate of change in the logarithm of the pressure $P_T$ applied to the diaphragm 25, the position of the E-pickup vane will change at a rate such as to result in a constant rotational speed of the motor 51. The generator 55 includes input winding 63 energized from a constant source of alternating current 65, and there is further provided an output winding 67 having output lines 69 and 71 across which there is applied a voltage proportional to the rate of change of the logarithm of the total pressure $P_T$.

Further, the pressure PSI sensed in the chamber 16 is applied through a conduit 76 to a suitable pressure sensing mechanism 80 in the static pressure servo 4, such as shown, for example, in the U.S. Patent No. 2,945,995. The static pressure servo 4 and the mechanism 80 includes suitable mechanism such as heretofore explained with reference to the total pressure servo 2 and mechanism 20 and corresponding parts have been indicated in the static pressure servo 4 by like numerals to which have been applied the suffix A.

The pressure sensing mechanism 80 includes the diaphragm of bellows 25A responsive to the sensed pressure PSI and operatively connected through a suitable linkage indicated by the numeral 29A to an armature or magnetic control vane 21A of an E-pickup device indicated generally by the numeral 33A and including an energizing winding 35A connected to a suitable source of alternating current and inductively coupled to the control winding 36A through the E-shaped core 37A and armature 31A.

The E-pickup device 33A is of a conventional type and is so arranged that the vane or armature 31A may be adjusted by the bellows 25A relative to the core 27A so as to control the phase and magnitude of the alternating current induced in the windings 36A and applied across output lines 43A and 44A leading from the E-pickup 33A.

Thus a change in the sensed static pressure applied to the diaphragm 25A would cause a change in displacement of the E-pickup. This error voltage is in turn applied across the output lines 43A and 44A leading to an electronic amplifier 45A of conventional type having output lines 46A and 47A leading to a control winding 49A of a suitable variable speed two-phase servomotor 51A of conventional type driving through a shaft 53A a tachometer generator 55A.

The arrangement is such that the error voltage applied through the amplifier 45A to the motor 51A causes the motor 51A to turn the shaft 53A and the generator 55A at a speed varying with the rate of change in the logarithm of the sensed pressure PSI. The E-core 37A is repositioned by a follow-up shaft 61A driven from shaf 53A so as to reduce the error voltage to zero.

For a constant rate of change in the logarithm of the pressure PSI applied to the diaphragm 25A, the position of the E-pickup vane 31A will change at a rate such as to result in a constant rotational speed of the motor 51A. The generator 55A includes input winding 63A energized from a constant source of alternating current 65A, and there is further provided an output winding 67A having output lines 69A and 71A across which there is an output voltage proportional to the rate of change of the logarithm of pressure PSI.

The outputs of the tachometer generator 55 and 55A are connected in a network in opposing relation by the connection of conductor 71 to the conductor 71A so that there is applied across the leads 69 and 69A a voltage proportional to the rate of change of logarithm of the total pressure $P_T$ minus the rate of change of the logarithm of the static pressure PSI equivalent to the rate of change of the log $P_T/PSI$ which approximates the rate of change of the Mach number.

As heretofore noted, the function of the log $PT/PSI$ is close to the Mach function, and it is sufficiently close, in fact, so that a log $P_T/PSI$ rate may be substituted for the Mach rate in an automatic pilot stabilizing system. It will also be noted that the computational change starts with a log $P_T$ servo 2 and a log PSI servo 4. Further, by coupling a tachometer generator 55 and 55A to the respective servomotors 51 and 51A, there is obtained a log $P_T$ rate and a log PSI rate. The log PSI generator 55A is normally required in any case to furnish a stabilizing signal to the autopilot indicated herein schematically by the numeral 75, and which stabilizing signal is closely proportional to the altitude rate of change.

Further, it will be seen that by use of a suitable network, as shown in the drawing, to subtract the log PSI tachometer voltage from the log $P_T$ tachometer voltage, a resulting voltage applied across the lines 69 and 69A is proportional to the log $P_T/PSI$ and may be used directly as a Mach rate signal to be applied to the automatic pilot, thereby eliminating the need for an additional servo.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. For use with an air pressure probe including means for sensing total impact air pressure and means for sensing static atmospheric pressure during flight of an aircraft at Mach numbers above and below that of the speed of sound; an electrical signal generating mechanism comprising a first variable speed servomotor, means operatively connected to said first servomotor and controlled by said total impact air pressure sensitive means so as to cause said first servomotor to drive at a speed proportional to the rate of change of said total impact air pressure, another means operatively connected to said second servomotor and, a second variable speed servomotor controlled by said static atmospheric pressure sensitive means so as to cause said second servomotor to drive at a speed proportional to the rate of change of said static atmospheric pressure, a first tachometer generator driven by the first servomotor, a second tachometer generator driven by the second servomotor, an electrical network in which said first and second tachometer generators have electrical outputs so connected and arranged as to cause the output of the voltage from the second tachometer generator to subtract from the output voltage from the first tachometer generator so as to effect a resulting voltage which is approximately proportional to the rate of change of the Mach number of said aircraft.

2. For use with an air pressure probe including means for sensing total impact air pressure and means for sensing static atmospheric pressure during flight of an aircraft at Mach numbers above and below that of the speed of sound; an electric signal generating mechanism comprising a computational means including a total impact air pressure variable speed controlled servomotor, a static atmospheric pressure variable speed controlled servomotor, a tachometer generator driven by the first-mentioned servomotor at a speed proportional to the rate of change of the total impact air pressure to effect an output voltage signal proportional to the rate of change of the total impact air pressure, another tachometer generator driven by the second-mentioned servomotor at a speed proportional to the rate of change of the static atmospheric pressure to effect an output voltage signal proportional to the rate of change of the static atmospheric pressure, and an electrical network in which the aforesaid ouput voltage rate signals are so applied as to in effect subtract the second-mentioned output rate signal from the first-mentioned output rate signal to provide a resultant voltage signal which is approximately proportional to the rate of change of the Mach number of said aircraft.

References Cited by the Examiner

UNITED STATES PATENTS 2,806,353  9/57  Grafinger _____ 73—182 X

ISAAC LISANN, *Primary Examiner.*

LEONARD FORMAN, *Examiner.*

UNITED STATES PATENT OFFICE
CERTIFICATE OF CORRECTION

Patent No. 3,209,592                          October 5, 1965

Donald F. Hastings

It is hereby certified that error appears in the above numbered patent requiring correction and that the said Letters Patent should read as corrected below.

Column 4, lines 26 to 28, strike out "another means operatively connected to said second servomotor and, a second variable speed servomotor" and insert instead -- a second variable speed servomotor, another means operatively connected to said second servomotor and --.

Signed and sealed this 26th day of April 1966.

(SEAL)

Attest:

ERNEST W. SWIDER
Attesting Officer

EDWARD J. BRENNER
Commissioner of Patents